United States Patent
Prakah-Asante et al.

(10) Patent No.: US 6,944,544 B1
(45) Date of Patent: Sep. 13, 2005

(54) ADAPTIVE VEHICLE SAFETY SYSTEM FOR COLLISION COMPATIBILITY

(75) Inventors: Kwaku O. Prakah-Asante, Commerce Township, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/711,314

(22) Filed: Sep. 10, 2004

(51) Int. Cl.[7] ............................................. G01S 13/93
(52) U.S. Cl. ........................ 701/301; 701/45; 701/48; 701/96; 342/42; 342/70
(58) Field of Search ............................. 701/45, 48, 91, 701/96, 301, 302; 280/5.504, 5.505, 5.514, 280/6.155; 340/435, 436; 342/42, 44, 51, 342/70, 72, 82, 83, 84, 85, 87, 107–109, 342/113–115, 125, 133, 139, 146, 147, 157, 342/158

(56) References Cited

U.S. PATENT DOCUMENTS

| | | | |
|---|---|---|---|
| 5,070,334 A * | 12/1991 | Commissaire et al. | 342/43 |
| 5,424,747 A * | 6/1995 | Chazelas et al. | 342/70 |
| 5,430,647 A | 7/1995 | Raad et al. | |
| 5,506,584 A * | 4/1996 | Boles | 342/42 |
| 5,530,648 A | 6/1996 | Lavey | |
| 5,589,827 A * | 12/1996 | Scurati | 340/901 |
| 5,933,099 A * | 8/1999 | Mahon | 340/961 |
| 6,015,155 A | 1/2000 | Brookes et al. | |
| 6,025,796 A * | 2/2000 | Crosby, II | 342/70 |
| 6,026,347 A * | 2/2000 | Schuster | 701/301 |
| 6,168,171 B1 | 1/2001 | Shono et al. | |
| 6,420,996 B1 | 7/2002 | Stopczynski et al. | |
| 6,452,535 B1 | 9/2002 | Rao et al. | |
| 6,477,466 B1 | 11/2002 | Kocherscheidt et al. | |

* cited by examiner

*Primary Examiner*—Richard M. Camby
(74) *Attorney, Agent, or Firm*—Frank A. MacKenzie; Artz & Artz, P.C.

(57) ABSTRACT

A safety system for a host vehicle includes a pre-crash sensing system generating host vehicle dynamics data, a target vehicle threat assessment, and target vehicle bumper or doorsill location data. A ride-height, Dynamic State Self-Turning (DSST) controller generates a reference ride-height signal as a function of the host vehicle dynamics data, target vehicle threat assessment, and target vehicle bumper or doorsill location data. A Rule-Based Height Regulator (RBHR) controller is feedback communication with an adjustable suspension system, is programmed to continuously adjust the host vehicle ride-height with reference to the ride-height signal, and the host vehicle bumper location to optimize the collision conditions between the two vehicles until just prior to impact.

19 Claims, 7 Drawing Sheets

ADAPTIVE VEHICLE SAFETY SYSTEM FOR COLLISION COMPATIBILITY

TECHNICAL FIELD

The present invention relates to pre-crash sensing systems for automotive vehicles, and more particularly, to pre-crash sensing systems providing an adaptive vehicle dynamic state modification for improved collision compatibility.

BACKGROUND OF THE INVENTION

Automobiles utilize safety restraint systems to protect vehicle occupants. Most vehicle safety systems are designed to mitigate potential injuries to occupants during vehicle crashes. For example, vehicles commonly employ restraint systems which may include safety devices such as front airbags, side airbags, and seatbelt pretensioners. Many of these restraint systems are activated in response to passive accelerometer-based collision detection sensors. Besides the safety systems, which directly act upon vehicle occupants to mitigate potential injuries in the event of a collision, other safety systems are known which are designed to improve the vehicle's ability to dissipate the impact event energy to portions of the vehicle other than the passenger compartment. For example, such safety systems could include bumper airbags or other external airbags, active chassis or front-end stiffening systems, or bumper height adjustment such that the vehicle body structure can bear, to the maximum extent, the impact energy.

Automobile manufacturers are also investigating radar, lidar and vision-based pre-crash sensing systems to improve occupant safety. Such pre-crash sensing systems can be used to deploy active or passive countermeasures to enhance injury mitigation. Such pre-crash sensing systems provide advance warning of imminent collision events such that safety systems can be pre-armed or deployed just prior to impact so that their effectiveness can be maximized. For example, pre-crash sensing systems are highly desirable for effective implementation of external airbag applications.

Most vehicle safety systems, however, typically react or are activated without regard to the target vehicle or detected object dynamics. For instance, vehicle-to-vehicle collision compatibility is an increasingly important safety issue for the automotive industry. That is, the crash compatibility of passenger cars, light trucks and vans in vehicle-to-vehicle collisions could provide potential improvements for passenger safety. An important element in the incompatibility of, for example, passenger cars and light trucks during a collision event, is due to the geometric mismatch in front-to-front and front-to-side collisions. Thus, in cases when a light truck or sport utility vehicle collides with a passenger car, the longitudinal rails of both vehicles are not always directly involved in absorbing the crash energy. Misalignment of these stiff longitudinal rails can result in higher passenger compartment intrusion levels due to less than desirable energy absorption by the stiff elements in mismatched front-to-front and front-to-side collisions.

Accordingly, to reduce the likelihood of occupant injury, there exists a need for safety systems which can avoid geometrical mismatches between vehicles, particularly in front-to-side impact scenarios. Lowering the ride-height of a sport utility vehicle, or increasing the ride-height of a passenger car by a fixed amount before a crash event is one solution being considered within the automotive industry. However, design considerations have resulted in a range of bumper heights, front longitudinal member heights, and side sill heights for various vehicles. In addition, because present safety systems do not account for the dynamic reaction of the target vehicle, the host vehicle may adjust suspension heights based upon driving conditions and the target vehicle may be in the process of correspondingly doing the same. Thus, the possibility of one vehicle increasing its bumper height while the other vehicle is in the process of lowering its bumper height, thereby maintaining or worsening the originally detected geometric mismatch could occur. Further, due to variation in vehicle loads, the vehicle ride-heights before a collision event could also vary. Consequently, there exists a need for new methods and systems to provide improved vehicle-to-vehicle collision compatibility.

SUMMARY OF THE INVENTION

The present invention provides a new method and system for collision compatibility, which automatically sets and adaptively tunes the required host vehicle ride-height based upon the dynamic collision characteristics of the host vehicle and the target vehicle or object. The present system intelligently adjusts the host vehicle suspension to attain and maintain a desired vehicle ride-height to achieve improved and robust occupant protection. A remote sensor network system, such as a pre-crash sensing system, provides information about the type and size of the collision partner as well as the bumper height for a front-to-front collision or doorsill heights for a front-to-side collision. The range and the closing velocity of the potential target vehicle or object are also obtained to improve system responsiveness and awareness.

In one embodiment, a safety system for a host vehicle is provided. The system includes a pre-crash sensing system generating host vehicle dynamics data, a target vehicle threat assessment, and target vehicle bumper or doorsill location data. The system also includes a ride-height controller referred to as a Dynamic State Self-Tuning (DSST) controller in electronic communication with the pre-crash sensing system. The DSST controller generates a reference ride-height signal as a function of the host vehicle dynamics data, target vehicle threat assessment, and target vehicle bumper or doorsill location data. A Rule-Based Height Regulator (RBHR) controller in operative communication with the DSST controller and an adjustable suspension system is programmed to modify the ride-height signal as a function of the target vehicle bumper or doorsill location data when the target vehicle threat assessment indicates an imminent crash event. The adjustable suspension system is included in operative communication with the RBHR controller and is adapted to adjust the host vehicle suspension height in response to the ride-height signal. Thus, the system continuously adjusts the host vehicle ride-height with reference to the target vehicle bumper or doorsill location to optimize the collision conditions between the two vehicles. The RBHR continuously modifies the ride-height, if necessary, up until approximately 40 ms prior to impact.

In another aspect, vehicle crash safety system for a host vehicle includes a pre-crash sensing system generating host vehicle dynamics data, a target vehicle threat assessment, and target vehicle bumper or doorsill location data. A DSST controller in electronic communication with the pre-crash sensing system generates a reference ride-height signal as a function of said host vehicle dynamics data, target vehicle threat assessment, and target vehicle bumper or doorsill location data. A host vehicle ride-height sensor provides a measured ride-height signal. A Rule-Based Height Regulator (RBHR) controller is in feedback communication with an adjustable suspension system and the ride-height sensor. The RBHR controller is programmed to modify the host vehicle suspension height as a function of an error signal representing a difference between the measured ride-height signal and the referenced ride-height when the target vehicle threat assessment indicates an imminent crash event. The adjustable suspension system in operative communication with the RBHR controller is adapted to adjust the host vehicle suspension height in response to the reference ride-height signal.

In a further aspect of the invention, a method for operating a safety system for a host vehicle includes generating host vehicle dynamics data, a target vehicle threat assessment, and target vehicle bumper or doorsill location data from a pre-crash sensing system. The method then generates a reference ride-height signal as a function of the host vehicle dynamics data, target vehicle threat assessment, and target vehicle bumper or doorsill location data. The reference ride-height signal is communicated to an adjustable suspension system of the host vehicle, which is adapted to operate the host vehicle ride-height as a function of the reference ride-height signal, and measured host vehicle ride-height. In response to an imminent crash event, the host vehicle ride-height is modified as a function of the reference ride-height signal and the measured host vehicle ride-height. The reference ride-height is generated based on the target vehicle bumper or doorsill location data.

The present invention provides a number of advantages. One advantage is a system, which automatically adjusts the desired ride-height of the host vehicle to meet geometric collision compatibility requirements and to account for different ride-heights and vehicle geometries. The present method and system can also adjust the suspension height of the host vehicle only if the potential collision partner height is outside of a specific boundary range, thereby avoiding lowering of the host vehicle ride-height for similar vehicle-to-vehicle collision events. Thus, the host vehicle can effectively interact in a predictable manner to absorb the impact energy over a broad range of collision partners and collision types. By modifying the load of the impact event to maximize vehicle structural energy absorption, the system mitigates the aggressive affect of front-to-front and front-to-side impacts. The system is also advantageous in that it compensates for pitching motions or nose-dipping which typically occurs during hard braking by monitoring feedback from the front suspension system. In addition, the system compensates for the situation when the vehicle height has already been reduced. The method also dynamically compensates for the occurrence of bumper overriding effects in the case of a front-to-front collision and overriding of doorsills for side impact events, which otherwise could lead to excessive occupant compartment intrusion. Thus, the present method provides a system to assist vehicles in absorbing the collision energy with minimal occupant compartment intrusion.

Other advantages and features of the present invention will become apparent when viewed in light of the detailed description when taken in conjunction with the attached drawings and appended claims.

BRIEF DESCRIPTION OF THE DRAWINGS

For a more complete understanding of this invention reference should now be made to the embodiments illustrated in greater detail in the accompanying figures and described below by way of examples of the invention wherein.

DETAILED DESCRIPTION

Figure 1:
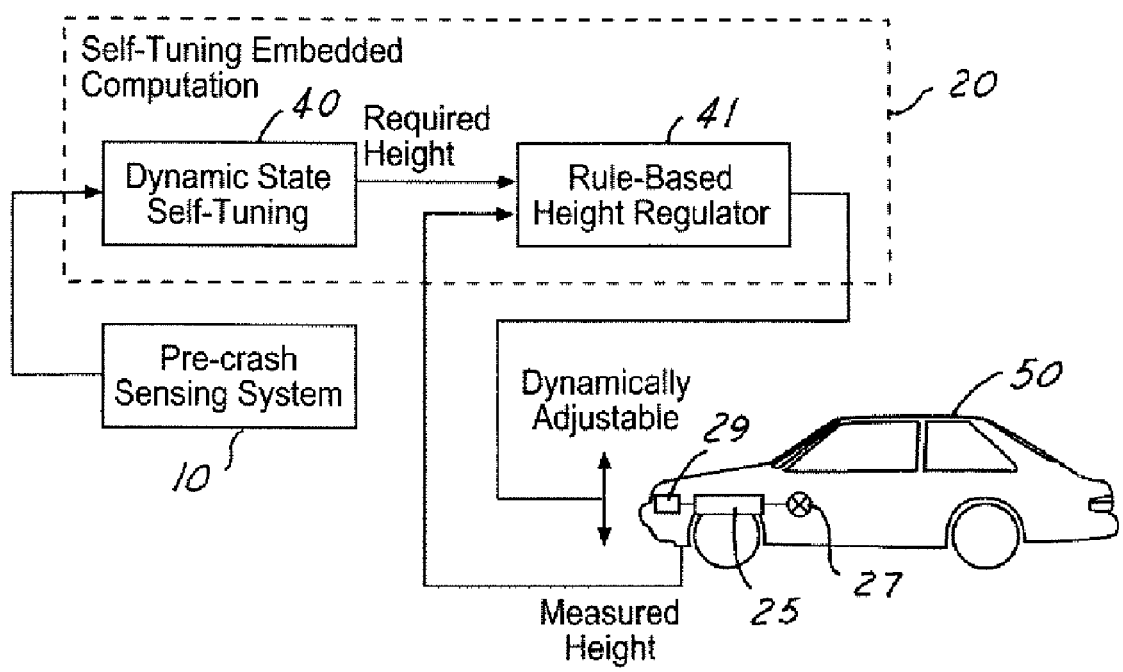
FIG. 1 is a block diagram of one embodiment of an adaptive safety system for collision compatibility in accordance with the present invention.

In the following figures, the same reference numerals will be used to refer to the same components. In the following description, various operating parameters and components are described for one constructed embodiment. These specific parameters and components are included as examples and are not meant to be limiting.

Referring now to FIG. 1, there is shown a block diagram of one embodiment of adaptive vehicle safety system for collision compatibility in accordance with the present invention. The system 20 is implemented within a host vehicle 50 and operates in coordination with the vehicle pre-crash sensing system 10 and the height-adjustable suspension system 25. In this example, the adjustable suspension system 25 is an air-based adjustable suspension system such as disclosed in U.S. Pat. No. 5,530,648, assigned to the assignee of the present invention, and herein incorporated by reference. The adjustable suspension system 25 includes one or more adjustable valves 27 having both a valve position regulation for inlet airflow, and a valve position regulation for outlet airflow. That is, the inlet airflow and outlet airflow of the valve can be controlled to dynamically adjust the suspension height. Height adjustment may be available for the front suspension, rear suspension, or independently at each corner of the vehicle in the vicinity of each wheel location. However, other types of known adjustable suspension units 25 may be utilized as well. The present invention is not meant to be limited solely to an air adjustable suspension unit. For example, hydraulic and electronic suspension units could also be used in cooperation with the present control system and method.

The suspension system 25 generally operates in response to signals generated from sensors 29 such as a height sensor and/or inclinometer. As is known, height sensors typically generate continuous analog voltage signals corresponding to the deviation from a nominal vertical distance between the vehicle chassis and the road wheels, this distance being commonly referred to as ride-height. Alternatively, ride-height is the measurement of the distance between the chassis and the ground at a particular point on the chassis. The ride-height may be measured at each of the suspension units on the vehicle. A vehicle is typically designed to operate at a desired ride-height. Vehicles equipped with height-adjustable suspension systems can adjust the actual ride-height to maintain the desired ride-height under varying loads. Ride-height sensors may also be integrated within the suspension system 25 with equivalent functionality. The suspension system sensors 29 may also include an inclinometer for determining a relative pitch angle of the chassis from the true horizontal. The inclinometer may comprise any of a number of known electronic leveling tools such as level transducers, or a digital inclinometer. These inclinometers generate a continuous analog voltage signal corresponding to the angular deviation of the chassis relative to the true horizontal.

The adaptive vehicle safety system for collision compatibility 20 comprises a ride-height controller called a Dynamic State Self-Tuning (DSST) controller 40 and a Rule-Based Height Regulator (RBHR) 41 to effectively meet safety performance specifications for different vehicle types, ride-heights and crash conditions. The DSST 40 utilizes information from the pre-crash sensing system 10 to monitor the range, range-rate, potential impact time, and object-type information to determine the type of vehicle and bumper/doorsill height information of the detected object. The DSST 40 then determines a desired reference ride-height target and communicates this reference ride-height target to the RBHR 41. The RBHR 41 then manipulates the air suspension system valves 27 positioning to achieve and maintain the reference ride-height to assist in collision compatibility. The RBHR 41 also performs plausibility checks for sensor reliability to discern a confidence level in the information received from the pre-crash sensing system 10 regarding the target vehicle bumper or doorsill height data. Thus, the DSST 40, by setting the desired reference ride-height based upon the remote sensor information, i.e., the pre-crash sensing system 10, sets the framework for systematic decision making by the RBHR 41. The RBHR 41, however, is the primary controller within this architecture for robust occupant protection. As explained in more detail below, the RBHR 41 intelligently adjusts the electronic air suspension valves 27 to reach and maintain the desired vehicle ride-height of the host vehicle to achieve improved robust occupant protection. This automatic fine tuning of the ride-height of the host vehicle is carried out once imminent crash conditions are satisfied until approximately 30–40 ms prior to the impact event. By continuously adjusting the ride-height based upon feedback from the host vehicle 50 state conditions as well as the target vehicle dynamics, the present system 20 improves alignment to maximize the effectiveness of structural interaction between the host and target vehicles. As explained in more detail below, the RBHR 41 incorporates a rule-based inference system which is used to determine an output valve/airflow position value for the electronic air suspension valves 27. In one example, the error or difference between the desired target suspension height and the present height, and the change in height-error undergo rule-based inference to determine a value depicting the change in required valve position. The embedded computation facilitates achieving the performance specification for the ride-height, in the presence of the non-linear characteristics of valve position and airflow rate.

As shown, the DSST 40 and RBHR 41 architecture forms a central advisory system which feeds information to the local decentralized suspension system 25. However, the entire system can be part of the suspension system 25. The decision-making computations described in detail below which are incorporated into the DSST 40 and the RBHR 41 may be based upon fuzzy reasoning, pattern recognition systems with polynomial and neuro-network classifiers to determine crash conditions, or look-ups in a look-up table corresponding to the collision conditions. Further, although the pre-crash sensing system 10, DSST 40, RBHR 41, and suspension controller 25 are shown as separate components, their functions may be incorporated into a single controller having multi-level controller function. In addition, the pre-crash sensing system 10, the DSST 40, RBHR 41, and suspension system 25 including a suspension controller may be microprocessor-based such as each being a computer having a central processing unit, memory (RAM and/or ROM), and associated input and output buses. These controllers may be application-specific integrated circuits or be formed of other logic devices known in the art. They also may form a portion of a central vehicle main control unit, a main safety controller, or may be stand alone controllers as shown.

Figure 2:
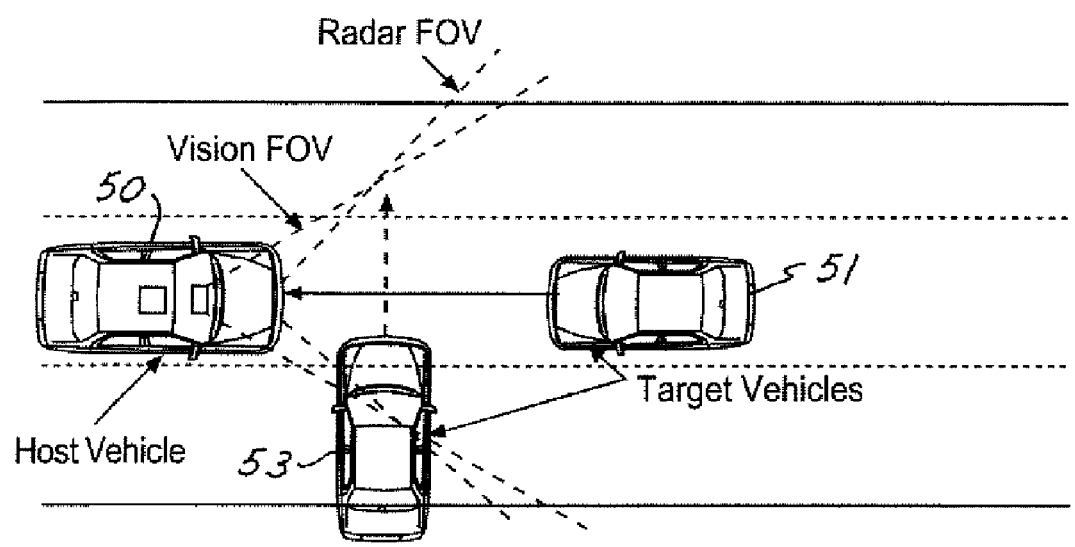
FIG. 2 shows a schematic diagram of a host vehicle having an adaptive vehicle safety system for collision compatibility in exemplary impact scenarios.

FIG. 2 shows a schematic diagram of the host vehicle 50 in different impact scenarios. FIG. 2 shows the field-of-field of the remote sensors which are part of the pre-crash sensing system 10 configured to allow detection of various crash scenarios for target tracking and classification. The sensor locations in this example, cover 90° frontal impacts, side impacts and off-set an oblique-type collisions. If the target vehicle 51 has similar bumper height to that of the host vehicle 50, or if the target vehicle 53 has similar side doorsill height as the host vehicle 50 bumper height, no activation or adjustment of the ride-height is performed. The initial conditions of the host vehicle 50 are used to determine the reference ride-height set-points.

Figure 3:
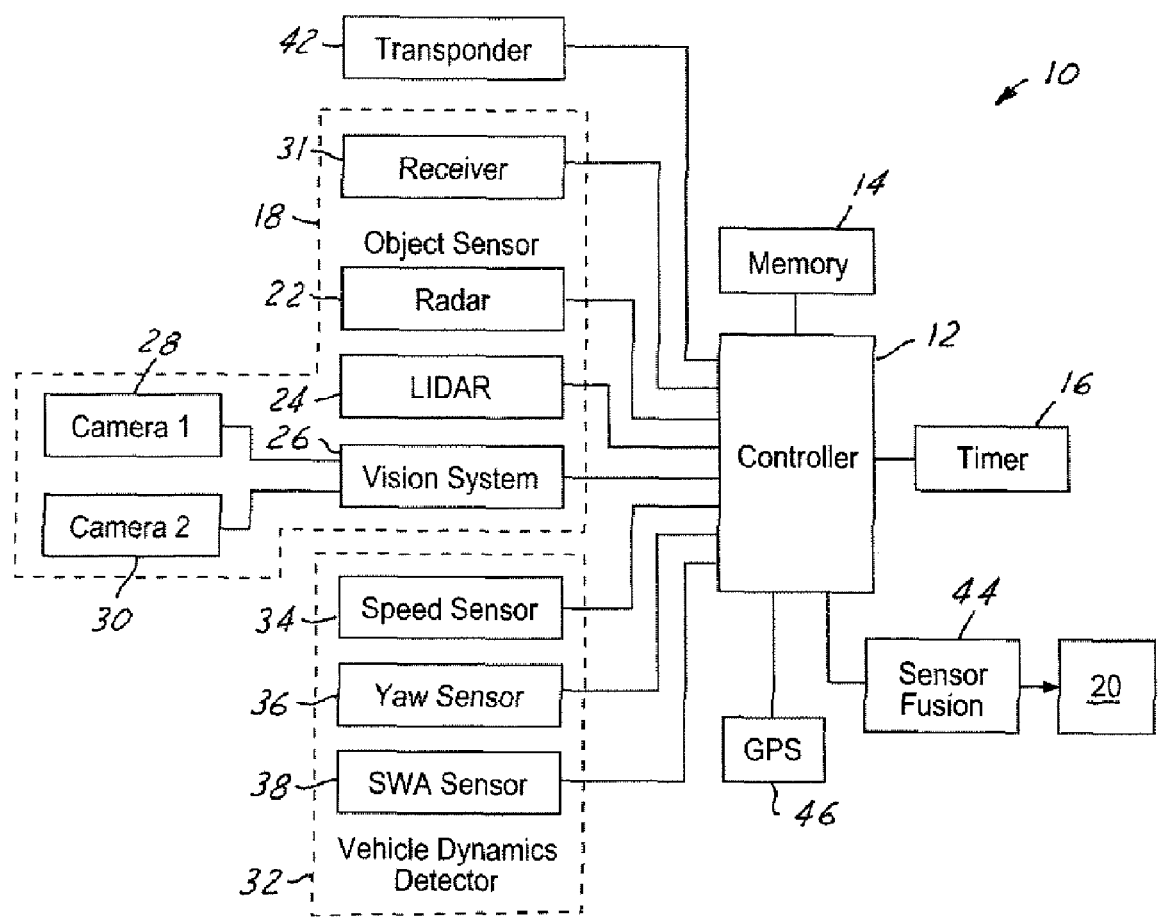
FIG. 3 shows a block diagram of one embodiment of the pre-crash sensing system for the adaptive vehicle safety system for collision compatibility in accordance with an embodiment of the present invention.

FIG. 3 is a block diagram of one embodiment of the pre-crash sensing system 10 providing the remote sensor data to the adaptive vehicle safety system for collision compatibility 20. The pre-crash sensing system 10 incorporates a vision system 26 and radar sensors 22 or lidar sensors 24 to obtain remote information about potential obstacles in the path of the host vehicle 50 before collision. The system 10 may also receive information as transmitted by a target vehicle transponder system. The pre-crash sensing system 10 also provides host vehicle dynamics information. One or more of the object detection systems may be used in a sensor fusion stage which may be included to determine the degree of usefulness of each measured signal input such that the pre-crash sensing controller produces a weighted output from the combination of signals. The pre-crash sensing system 10 outputs to the DSST 40 range, range rate, potential impact time, and target vehicle data including the type of vehicle and bumper or doorsill height information of the target vehicle. One embodiment of the pre-crash sensing system 10 is shown schematically in FIG. 3.

The pre-crash sensing system 10 of FIG. 3 has a controller 12. Controller 12 can be a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For an example based on time, the acceleration of the vehicle can be determined from a velocity.

A remote object sensor 18 is coupled to controller 12. Remote object sensor 18 generates an object signal in the presence of an object within its field of view. Remote object sensor 18 may be comprised of one or a number of combinations of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. The camera system is also capable of detecting the distance of an object from the vehicle. Alternatively, radar 22 or lidar 24 may be used to detect an object within a detection zone and vision system 26 may be used to confirm the presence of the object within the detection zone and to provide the classification and size of the object as well as bumper/doorsill location data. In another embodiment of the invention vision system consisting of cameras 1 and 2, alone may use established triangulation techniques to determine the presence of an object, the distance from the vehicle and relative velocity of the object as well as the object's size that may include area, height or width, bumper or doorsill location, or combinations thereof. Preferably, the cameras are high-speed cameras operating in excess of 50 Hz. A suitable example is a CMOS-based high dynamic range camera cable of operating under widely differing lighting and contrast conditions.

A vehicle dynamics detector 32 is also coupled to controller 12. The vehicle dynamics detector 32 generates a signal or signals indicative of the dynamic conditions of the vehicle. The vehicle dynamics detector 32 may comprise various numbers or combinations of sensors but preferably include a speed sensor 34, a yaw rate sensor 36, and a steering wheel angle sensor 38. In addition, longitudinal acceleration sensor (not shown) may also be included in the vehicle dynamics detector 32. The longitudinal acceleration sensor can provide controller 12 some indication as to the occupant driving characteristics such as braking or deceleration. The vehicle dynamic conditions may also include host vehicle bumper height from the suspension height sensor.

Speed sensor 34 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 34 may include, for example, toothed wheel sensors such as those employed on anti-lock brake systems.

Yaw rate sensor 36 can provide the yaw rate of the vehicle about the center of gravity of the vehicle. The yaw rate measures the rotational tendency of the vehicle about an axis normal to the surface of the road. Although yaw rate sensor can be located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. The yaw rate sensor 36 and the vehicle speed sensor 34 or the steering wheel angle sensor 38 alone, or the above sensors in combination, may be used to indicate the kinematics of the vehicle.

A global positioning system (GPS) 46 may also be coupled to controller 12. GPS 46 system generates a vehicle position of the host vehicle in response to satellites. Controller 12 may use this information in determining the relative position of the host vehicle and a target vehicle.

Remote object sensor 18 may also include a receiver 31 for receiving a transponder signal from a similarly-equipped target vehicle. Receiver 31 may, however, be a stand alone device. Receiver 31 is also coupled to controller 12. Receiver 31 is used to receive signals from other vehicles or vehicle transponders.

Thus, the host vehicle is also equipped with an active transponder 42 capable of communicating with the interrogation systems carried on any other similarly-equipped vehicles, but this equipment is not shown in the figures for purposes of clarity. A transponder 42 may also be coupled to controller 12. Transponder 42 may generate information from controller 12 and transmit it to other vehicles upon the reception of a predetermined frequency signal from another vehicle. Also, transponder 42 may always be activated and broadcasting vehicle information to other vehicles. Transponder 42 and receiver 31 may be located in a common location and integrally formed therewith. Indeed, the host and target vehicles may be equipped with two or more separate transponder units which transmit distinct, differently coded response signals such that the left or driver side of a vehicle can be distinguished from a right or passenger side of a vehicle to aid in the orientation of a detected vehicle relative to the host vehicle.

Some of the static or dynamic target vehicle information contained in the transponder response signal cannot typically be detected by conventional radar or vision systems alone. Among these characteristics are wheel slip, steering wheel position, vehicle weight, bumper height, and precise target vehicle dimensions. Other types of target vehicle information, while detectable by radar or vision systems, can be determined with greater accuracy by the target vehicle's onboard sensors and be transmitted to the host vehicle in the transponder-response signal. Examples include target vehicle dynamic information such as location, velocity, and acceleration as determined by the target vehicle's accelerometers and/or a GPS system.

The overall accuracy and robustness of the pre-crash sensing system can therefore be improved by combining or integrating the radar and vision derived information with the information contained in the transponder-response signal which is potentially more accurate. This additional weighting step is shown in FIG. 3 as a separate sensor fusion controller 44 which may be part of the pre-crash sensing system controller 12. The weighted output from the combination of signals can then be transmitted to the DSST 40 along with the host vehicle dynamics information such that the DSST 40 can have an accurate awareness of the pre-impact scenario.

The lower bumper bar height of most passenger vehicles and light trucks falls within a range of approximately 35 cm to 70 cm. Based upon the known host vehicle data and the detected target vehicle data, the DSST 40 derives a reference host vehicle ride-height target based upon the collision partner characteristics. If the target vehicle has a similar bumper height, no modification of the host vehicle ride-height is performed. The DSST 40 makes use of the initial conditions of the host vehicle to determine the reference ride-height set-point. This represents the optimum host vehicle ride-height for the detected imminent crash situation. The RBHR 41 then adjusts the electronic air suspension valves 27 to reach and maintain the target vehicle ride-height of the host vehicle. The RBHR 41 continuously adjusts the ride-height based upon feedback from the host vehicle state conditions as well as the target vehicle's state conditions to improve alignment for effective structural interaction between the host and target vehicles. Adjustment continues until approximately 30–40 ms prior to impact.

Figure 4:
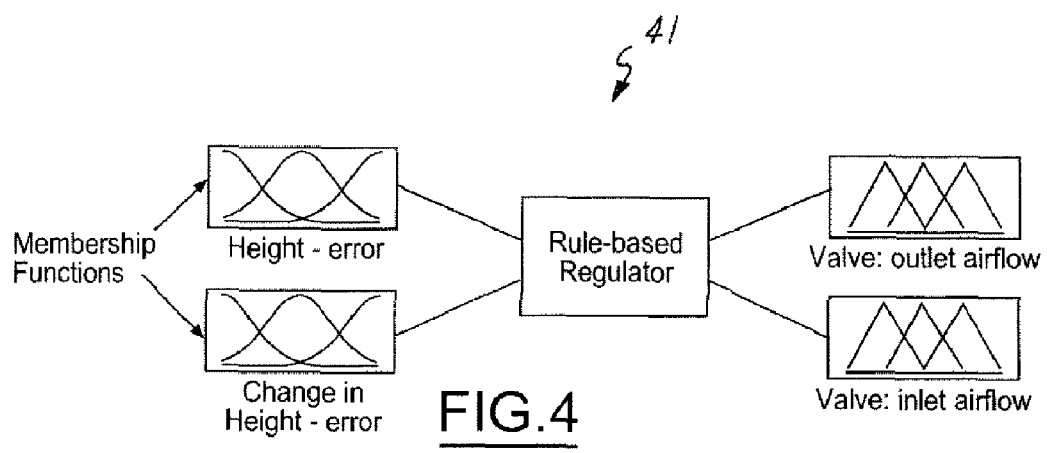
FIG. 4 shows a schematic diagram of one embodiment of the Rule-Based Height Regulator design architecture.

FIG. 4 shows a schematic diagram of the RBHR controller 41 architecture. The RBHR 41 architecture incorporates a rule-based inference system, which is used to determine the valve position for air inflow and air outflow, leading to the adjustment of the suspension height. In this example, the difference or error between the desired host targeted suspension ride-height and the current suspension ride-height, and the change in height-error undergo rule inference to determine a value depicting the change in required valve position. The valve position and airflow rates have non-linear characteristics. Thus, this embedded computation facilitates achieving the performance specifications for the targeted host vehicle ride-height in the presence of these non-linear characteristics.

Figure 5:
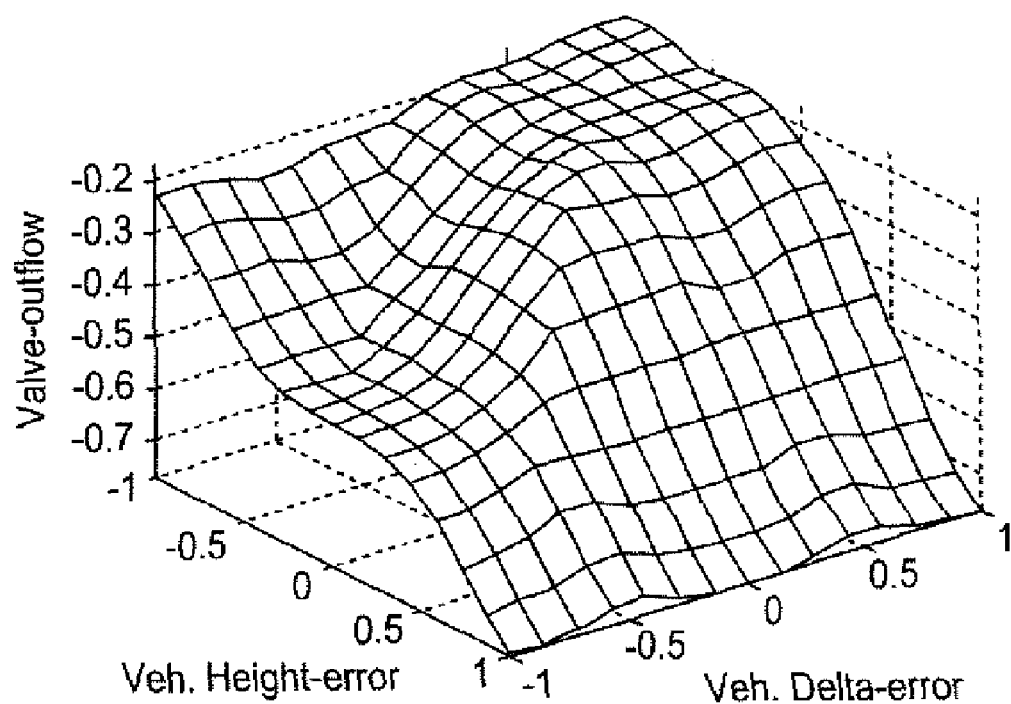
FIG. 5 shows a Rule-Based Height Regulator non-linear surface plot showing the normalized valve position output for air outflow based upon suspension height-error and change in height-error.
Figure 6:
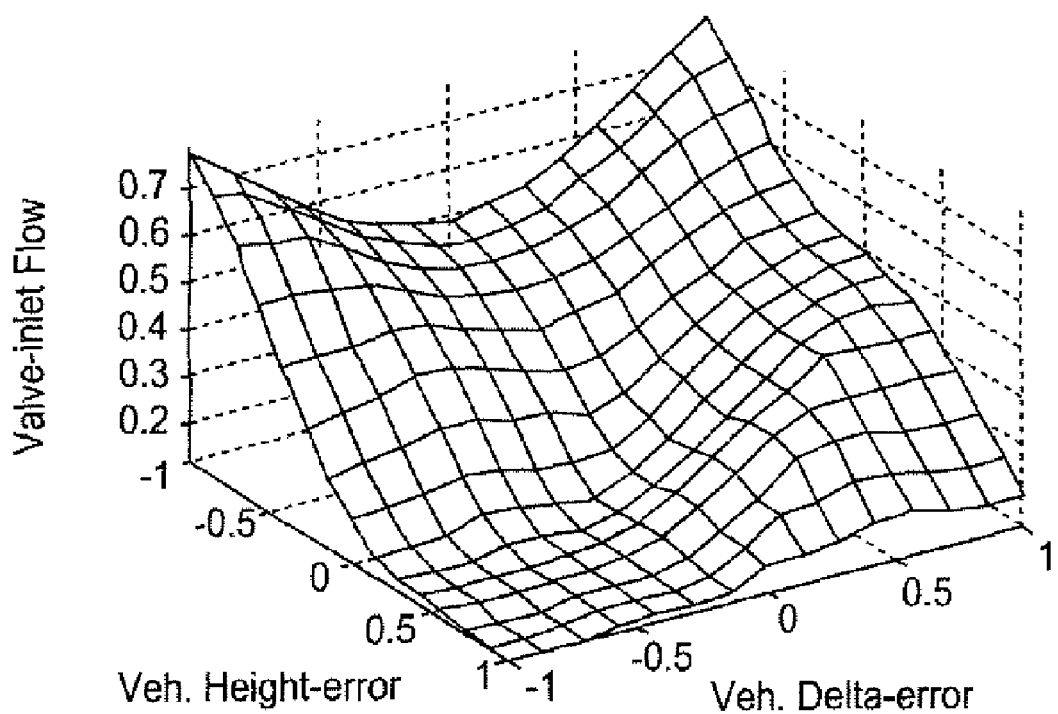
FIG. 6 shows the Rule-Based Height Regulator non-linear surface plot showing normalized valve position output for air inflow based upon suspension height-error and change in height-error.

The RBHR 41 architecture applies to both valve position regulation for inlet airflow and valve position regulation for outlet airflow. FIGS. 5 and 6 show exemplary outputs for the RBHR controller 41. In particular, FIG. 5 shows the RBHR output as a non-linear surface plot showing normalized valve position output for air outflow based upon suspension height-error and change in height-error. FIG. 6 shows one example of the RBHR output as a non-linear surface plot depicting normalized valve position output for air inflow based upon the suspension height-error and change in height-error. These height-error and change in height-error values are estimated by the RBHR from the targeted height and the measured host vehicle height by the sensors 29 for the suspension system 25 (FIG. 1). Positive valve output values are for air inflow to raise the electronic air suspension system, and negative valve output values represent air outflow to lower the suspension ride-height. High valve opening values are obtained for larger target ride-height errors. These non-linear surface plots depict the performance of the valve output positions for the electronically controlled air suspension system.

Figure 7:
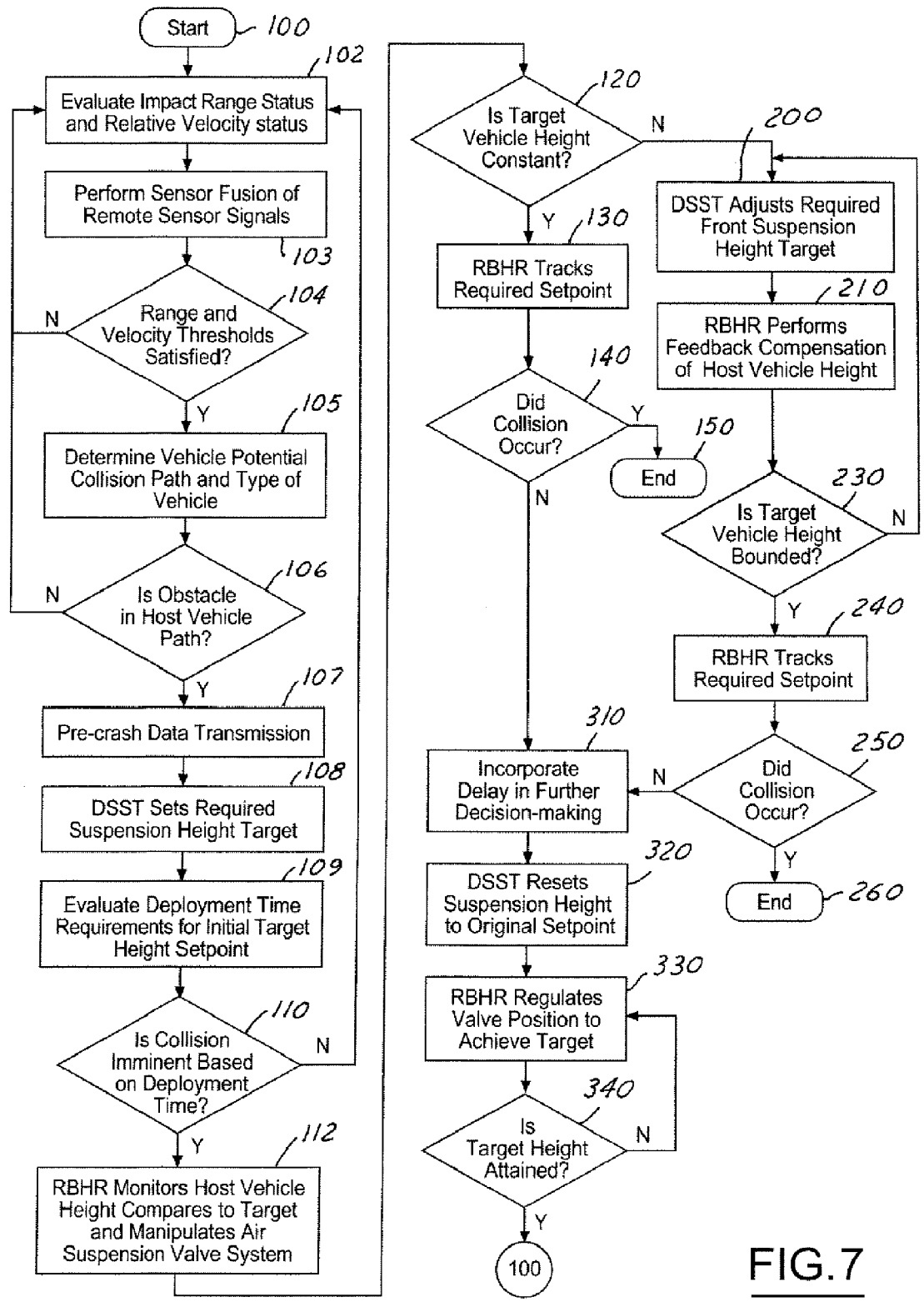
FIG. 7 shows a logic flow diagram of one method of implementing an adaptive safety system for collision compatibility in accordance with the present invention.

FIG. 7 shows a logic flow diagram of one method of implementing an adaptive vehicle safety system for collision compatibility in accordance with one embodiment of the present invention. The logic routine starts at step 100. Steps 102–107 are related to the pre-crash threat assessment system. Thus, step 102 evaluates the impact range status and relative velocity status of the host and target vehicles. This may include, at step 103, performing sensor fusion of the remote sensor signals wherein the control system determines the degree of confidence or usefulness of each measured signal input and produces a weighted output from the combination of signals. These signals may include vision system signals, radar or lidar system signals and transponder/receiver communications. If the range and velocity thresholds are satisfied in step 104, the obstacle or target vehicle information is determined in step 105 and a decision is made whether the target vehicle is in the host vehicle path making collision likely in step 106. Otherwise, the system continues to evaluate detected target vehicles and objects in step 102. If the target vehicle is in the host vehicle's path, the predicted time to collision is rendered in step 107. The pre-crash data is transmitted in 107 to the DSST. Such information may include the time to collision as well as the type of vehicle, i.e., passenger car, truck or van, and bumper height or doorsill height information for the target vehicle.

Given the predicted crash scenario, in step 108, the DSST sets a required suspension height target bounded within an error tolerance of the system. The suspension height set in step 108 may be based on the front bumper bar height of the host vehicle or doorsill height for the host vehicle. In step 109, the DSST evaluates deployment time requirements necessary to achieve the reference ride-height set point. In step 110, a decision is made whether the collision is imminent and the desired suspension ride-height adjustment can be made within the time window prior to impact. If the time window is satisfied, the RBHR analyzes the host vehicle ride-height and compares it to the target vehicle ride-height and manipulates the air suspension valve system as described above to achieve the reference host vehicle ride-height target.

For a period of time up to approximately 30–40 ms prior to impact, the RBHR controller receives feedback regarding the host vehicle ride-height and target vehicle ride-height data. Accordingly, in step 120 if the target vehicle ride-height is determined to be constant, the logic continues to step 130 wherein the RBHR manipulates the suspension system to achieve the desired reference host vehicle ride-height set-point. This continues in step 140 until the crash event. If, in step 120, the target vehicle height is not determined to be constant, the logic continues to step 200 and 210. In step 200, the DSST adjusts the reference host vehicle ride-height set point within the error tolerances of the system. In step 210, the RBHR performs feedback compensation of the host vehicle ride-height to achieve the adjusted targeted ride-height. If the target vehicle height is not bounded, in step 230, then the DSST continuously adjusts the targeted host vehicle ride-height and transmits this information to the RBHR to perform feedback control of the suspension system to achieve the new targeted host vehicle ride-height. That is, if the target vehicle is not determined to be at a relatively constant height, then it is subject to change, and the host vehicle must accordingly compensate for the same. Otherwise, if the target vehicle height is relatively constant, the RBHR controls the suspension system to the desired host vehicle ride-height set-point in step 240 until the collision occurs in step 250. In cases when collision does not occur, in steps 310–340, the DSST resets the host vehicle suspension height to the original set-point with reference to any time delay necessary to incorporate any changes. In step 320, the DSST resets the suspension height to the original set-point. In step 330, the RBHR then regulates the valve position to achieve the target ride-height as determined in step 320. Thus, steps 310 through 340 reset the vehicle ride-height to its original set-point in the event that a collision does not actually occur.

While particular embodiments of the invention have been shown and described, numerous variations and alternative embodiments will occur to those skilled in the art. Accordingly, it is intended that the invention be limited only in terms of the appended claims.

What is claimed is:

1. A vehicle crash safety system for a host vehicle comprising:
   a pre-crash sensing system generating host vehicle dynamics data, a target vehicle threat assessment, and target vehicle bumper or doorsill location data;
   a Dynamic State Self-Tuning (DSST) controller in electronic communication with said pre-crash sensing system, said DSST controller generating a reference ride-height signal as a function of said host vehicle dynamics data, target vehicle threat assessment, and target vehicle bumper or doorsill location data;

a Rule-Based Height Regulator (RBHR) controller in operative communication with said DSST controller and an adjustable suspension system, said RBHR controller programmed to adjust the host vehicle suspension height by said suspension system, in response to said reference ride-height signal and measured host vehicle suspension height, when said target vehicle threat assessment indicates an imminent crash event; and wherein said RBHR controller output modifies said host vehicle suspension height as a function of a height-error signal related to said target and host vehicle ride-heights, and said RBHR incorporates a multivariable rule-based strategy for vehicle suspension height adjustment.

2. A system as recited in claim 1 wherein said DSST controller sets said reference ride-height signal and said RBHR controller continuously adjusts said vehicle suspension height until approximately 40 ms prior to an impact event.

3. A system as recited in claim 1 wherein said adjustable suspension system comprises an air suspension system having at least one electronically controlled air valve.

4. A system as recited in claim 3 wherein said RBHR controller outputs a desired valve output position.

5. A system as recited in claim 4 wherein said RBHR controller modifies both an air inflow value and an air outflow value for said at least one air valve.

6. A vehicle crash safety system for a host vehicle comprising:

a pre-crash sensing system generating host vehicle dynamics data, a target vehicle threat assessment, and target vehicle bumper or doorsill location data;

a Dynamic State Self-Tuning (DSST) controller in electronic communication with said pre-crash sensing system, said DSST controller generating a reference ride-height signal as a function of said host vehicle dynamics data, target vehicle threat assessment, and target vehicle bumper or doorsill location data;

a Rule-Based Height Regulator (RBHR) controller in operative communication with said DSST controller and an adjustable suspension system, said RBHR controller programmed to adjust the host vehicle suspension height by said suspension system, in response to said reference ride-height signal and measured host vehicle suspension height, when said target vehicle threat assessment indicates an imminent crash event; and wherein said DSST controller and said RBHR controller comprise a centralized ride-height controller architecture separate from said adjustable suspension system.

7. A system as recited in claim 1 wherein said pre-crash sensing system comprises at least one of a vision system, radar system, lidar system, or transponder/receiver system.

8. A system as recited in claim 1 wherein said target vehicle threat assessment data includes target range, closing velocity, approach angle and target vehicle type.

9. A system as recited in claim 1 wherein said vehicle dynamics data includes vehicle speed, yaw rate, steering wheel angle and bumper height.

10. A system as recited in claim 7 wherein said pre-crash sensing system comprises a sensor fusion stage producing said target vehicle threat assessment as a weighted output of signals from at least two of said vision system, radar system, lidar system, or transponder/receiver system.

11. A method for operating a safety system for a host vehicle comprising:

generating host vehicle dynamics data, a target vehicle threat assessment, and target vehicle bumper or doorsill location data from a pre-crash sensing system;

generating a reference ride-height signal as a function of said host vehicle dynamics data, target vehicle threat assessment, and target vehicle bumper or doorsill location data;

communicating said reference ride-height signal to a RBHR controller, said RBHR controller sending suspension height modification signals to an adjustable suspension system of said host vehicle, said suspension system adapted to operate said host vehicle ride-height as a function of said suspension height modification signals; and in response to an imminent crash event, modifying said suspension height as a function of a height-error signal related to said target and host vehicle ride-heights, by a multivariable rule-based strategy for vehicle suspension height adjustment.

12. A method for operating a safety system for a host vehicle comprising:

generating host vehicle dynamics data, a target vehicle threat assessment, and target vehicle bumper or doorsill location data from a pre-crash sensing system;

generating a reference ride-height signal as a function of said host vehicle dynamics data, target vehicle threat assessment, and target vehicle bumper or doorsill location data;

communicating said reference ride-height signal to a RBHR controller, said RBHR controller sending suspension height modification signals to an adjustable suspension system of said host vehicle, said suspension system adapted to operate said host vehicle ride-height as a function of said suspension height modification signals; and wherein said adjustable suspension system comprises an air suspension system having at least one electronically controlled air valve, and wherein the step of modifying includes continuously modifying said air valve position with respect to real-time target vehicle bumper or doorsill location data.

13. A method as recited in claim 12 comprising determining said host vehicle ride-height and wherein the step of modifying includes adjusting an air valve outflow value or air valve inflow value as a function of a host and target vehicle height difference or error signal, and the change In height-error signal.

14. A method as recited in claim 12 wherein said air valve position is continuously modified until approximately 40 ms prior to an impact event.

15. A method as recited in claim 11 wherein said pre-crash sensing system comprises at least one of a vision system, radar system, lidar system, or transponder/receiver system.

16. A method as recited in claim 15 wherein said target vehicle threat assessment comprises a weighted output of signals from at least two of said vision system, radar system, lidar system, or transponder/receiver system.

17. A vehicle crash safety system for a host vehicle comprising:

a pre-crash sensing system generating host vehicle dynamics data, a target vehicle threat assessment, and target vehicle bumper or doorsill location data;

a Dynamic State Self-Tuning (DSST) controller in electronic communication with said pre-crash sensing system, said DSST controller generating a reference ride-height signal as a function of said host vehicle dynamics data, target vehicle threat assessment, and target vehicle bumper or doorsill location data;

a host vehicle ride-height sensor providing a measured ride-height signal;

a Rule-Based Height Regulator (RBHR) controller in feedback communication with an adjustable suspension system and said ride-height sensor, said RBHR controller programmed to adjust the host vehicle suspension height l as a function of an error signal representing a difference between said measured ride-height signal and said target vehicle bumper or doorsill location data when said target vehicle threat assessment indicates an imminent crash event, said RBHR incorporating multivariable rule-based strategy for vehicle suspension height adjustment; and said adjustable suspension system in operative communication with said RBHR controller and adapted to adjust said host vehicle suspension height in response to signals from the RBHR.

18. A system as recited in claim 17 wherein said adjustable suspension system comprises an air suspension system having at least one electronically controlled air valve.

19. A system as recited in claim 17 wherein said pre-crash sensing system comprises at least one of a vision system, radar system, lidar system, or transponder/receiver system.

* * * * *